W. R. PATTERSON.
AUTOMOBILE LAMP MECHANISM.
APPLICATION FILED MAY 28, 1913.
1,094,242.
Patented Apr. 21, 1914.
2 SHEETS—SHEET 2.
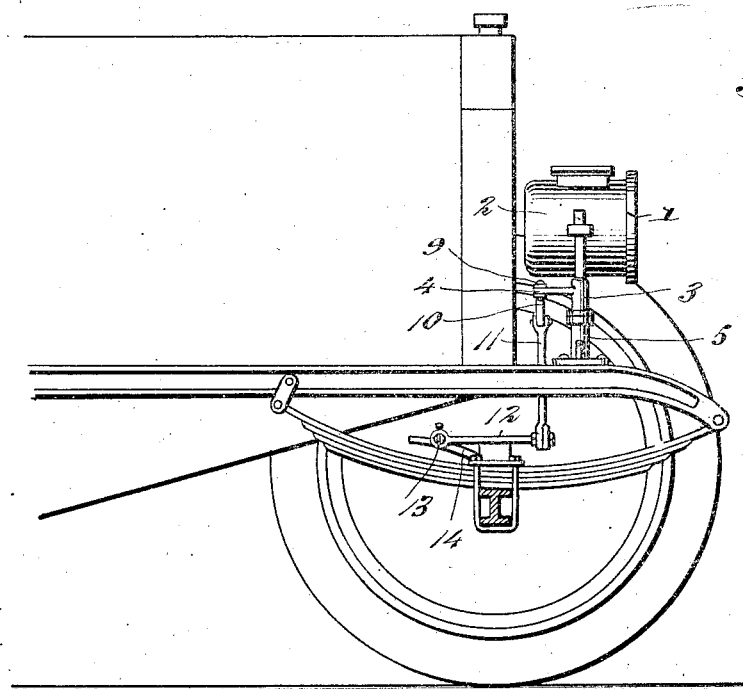
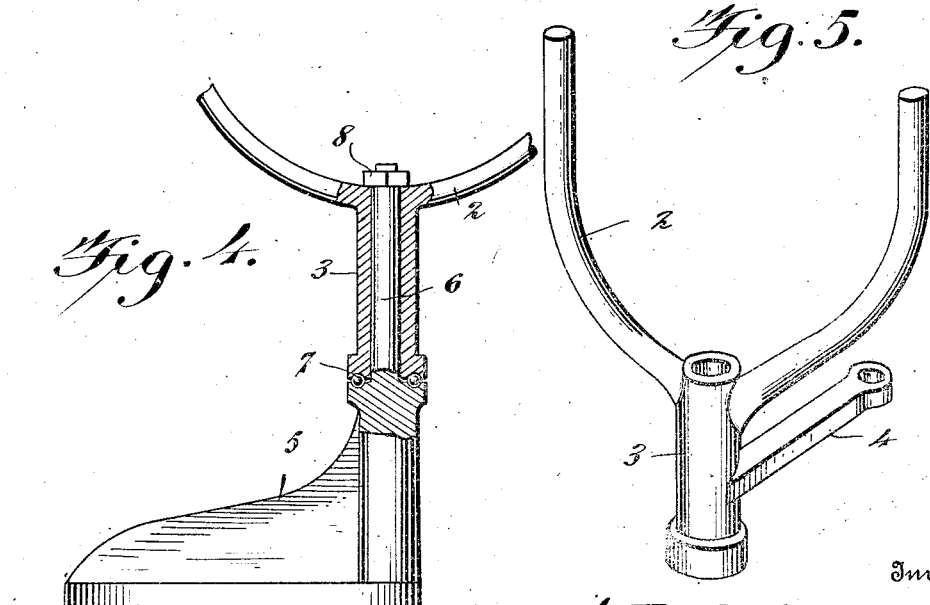

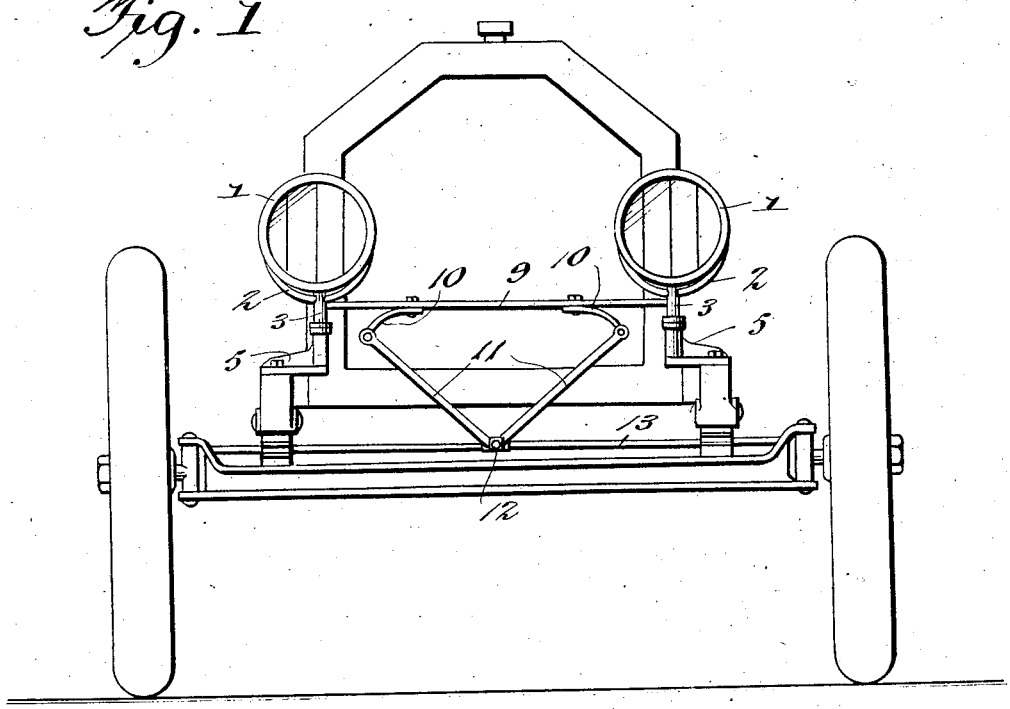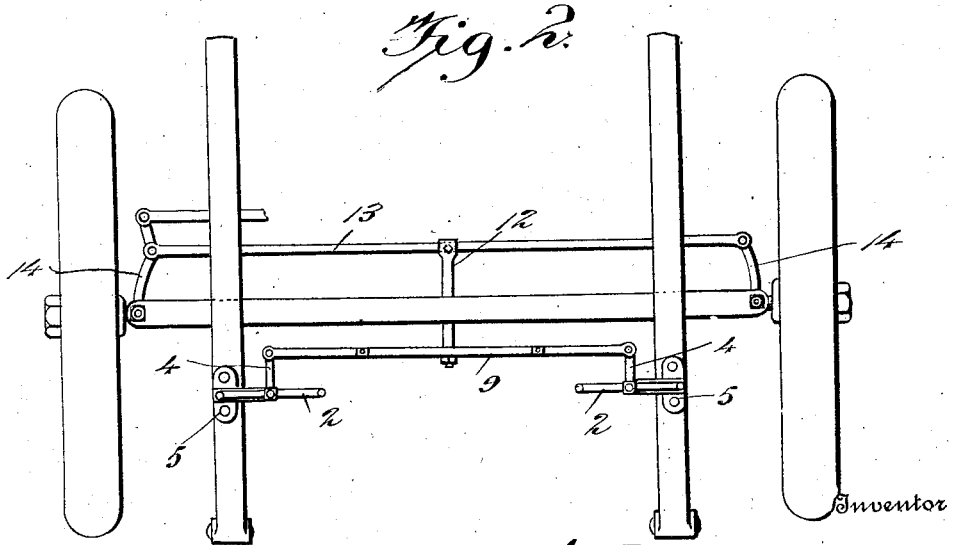

UNITED STATES PATENT OFFICE.

WILLIAM R. PATTERSON, OF LORETTO, KENTUCKY.

AUTOMOBILE LAMP MECHANISM.

1,094,242.   Specification of Letters Patent.   Patented Apr. 21, 1914.

Application filed May 28, 1913. Serial No. 770,420.

*To all whom it may concern:*

Be it known that I, WILLIAM R. PATTERSON, a citizen of the United States, residing at Loretto, in the county of Marion and State of Kentucky, have invented new and useful Improvements in Automobile Lamp Mechanism, of which the following is a specification.

The invention relates to vehicle headlights of the variety having connection with the steering mechanism to be moved thereby to throw the light in advance of the vehicle when making a turn, thereby enabling the operator to observe the roadway ahead in time to avoid a casualty, besides giving warning to a pedestrian or driver of a vehicle so that a collision may be prevented.

The invention aims to provide novel mountings for the lamps and peculiar connections between such mountings and the steering mechanism, whereby the lamps have a positive movement imparted thereto in each direction when operating the steering mechanism to turn the machine. Movement of the steering wheels results in a corresponding movement of the lamps to throw the light in advance of the vehicle or machine whether rounding a curve, turning a corner or going straight ahead.

The invention consists in the novel features, details of construction and combination of parts, which hereinafter will be more particularly set forth, illustrated in the accompanying drawings, and pointed out in the appended claim.

Referring to the drawings, forming a part of the specification, Figure 1 is a front view of part of an automobile provided with headlights embodying the invention. Fig. 2 is a top plan view of the forward portion of the chassis and lamp mechanism. Fig. 3 is a side view of the front portion of the machine. Fig. 4 is a detail view of a lamp bracket and support, partly in section. Fig. 5 is a detail view in perspective of a lamp support.

Corresponding and like parts are referred to in the following description, and indicated in all the views of the drawings, by the same reference characters.

The lamps 1, two in number, may be of any construction and are mounted upon the chassis of the vehicle or machine at the sides thereof in such a manner as to turn about vertical axes. As shown each lamp is fitted to a fork or support 2, having a tubular stem 3 from which an arm 4 projects. A bracket 5 is secured in any manner to a side bar of the chassis or main frame and is provided with a vertical extension 6 upon which the lamp fork is mounted by means of the tubular stem 3, which is slipped upon the extension 6 and retained in place thereon by means of a nut 8 threaded to the upper end of the part 6. Balls 7 are interposed between the lower end of the sleeve 3 and a shoulder formed at the base of the extension 6. A rod 9 connects the arms 4 of the two lamp forks to cause both to move in unison. Spring arms 10 are bolted or otherwise secured to the rod 9 and their lower ends are connected by means of rods 11 to the outer end of an arm 12, which is secured in any manner to the rod 13 connecting the arms 14 projecting from the steering knuckles. The means just described transmit motion from the rod 13 to the rod 9, with the result that movement of the rod 13 to turn the steering wheels results in a corresponding movement of the rod 9 and lamps so that when the vehicle or machine is turned to round a curve the lamps are correspondingly moved to throw the light in the path of the vehicle, thereby enabling the operator to observe the roadway a safe distance ahead as well as giving warning to a pedestrian or driver of any other vehicle so that a casualty may be avoided. The spring arms 10 provide for a limited movement between the rods 9 and 13 due to the action of the vehicle springs. These arms incline laterally in opposite directions and are free to move at their outer ends. The rods 11 are pivotally connected at their upper ends to the spring arms 10 and at their lower ends to the arm 12 thereby admitting of a pivotal movement between such parts to prevent any binding.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claim appended hereto.

Having thus described the invention what is claimed as new, is:—

In a headlight for a vehicle having steering knuckles, arms projecting from the steering knuckles and a rod connecting such arms, the combination of side lamp supports provided with offstanding arms, a rod connecting such arms to cause the lamps to move in unison, spring arms secured to the last mentioned rod and inclined in opposite directions, an arm projected from the rod connecting the arms of the steering knuckles, and upwardly diverged rods pivotally connected at their lower ends with the arm projecting from the rod connecting the arms of the steering knuckles and at their upper ends with the said spring arms.

In testimony whereof I affix my signature in presence of two witnesses.

WILLIAM R. PATTERSON.

Witnesses:
R. R. WARE,
SAM THOMAS.